United States Patent

[11] 3,622,340

[72] Inventor Robert W. Lamon
 Rochester, N.Y.
[21] Appl. No. 751,744
[22] Filed Aug. 12, 1968
[45] Patented Nov. 23, 1971
[73] Assignee Eastman Kodak Company
 Rochester, N.Y.

[54] 4-THIOURACIL COMPOUNDS AS FOG INHIBITORS
 18 Claims, No Drawings
[52] U.S. Cl. .................................................. 96/109,
 260/251
[51] Int. Cl. ................................................. G03c 1/34,
 C07d 5/18
[50] Field of Search .......................................... 96/109;
 260/251

[56] References Cited
UNITED STATES PATENTS
2,231,127 2/1941 Kendall .................. 96/109
FOREIGN PATENTS
484,595 5/1938 Great Britain ............ 96/109

Primary Examiner—Norman G. Torchin
Assistant Examiner—Richard E. Fichter
Attorneys—W. H. J. Kline and William E. Neely ABSTRACT: 4-Thiouracil compounds, including novel 4-thiouracil compounds, are prepared by reacting ammonia or primary amine with novel adducts of an alkoxycarbonyl isothiocyanate and a tertiary enamine. The 4-thiouracil compounds are useful photographic fog inhibitors.

4-THIOURACIL COMPOUNDS AS FOG INHIBITORS

The present invention relates to a process for preparing 4-thiouracil compounds, to certain adducts of tertiary enamines and alkoxycarbonyl isothiocyanates useful in the preparation of said 4-thiouracil compounds, to silver halide photographic emulsions containing at least one of said 4-thiouracil compounds, to photographic elements including fog-inhibiting amounts of said 4-thiouracil compounds and to certain of said 21-thiouracid compounds as new compounds. More particularly, the invention relates to a process of preparing 4-thiouracil compounds by reacting adducts of tertiary enamines and alkoxy-carbonyl isothiocyanates with ammonia or a primary organic amine, to novel adducts of tertiary enamines and alkoxycarbonyl isocyanates useful in the process, to silver halide photographic emulsions containing at least one of said 4-thiouracil compounds as a fog inhibitor, to light-sensitive photographic elements containing a support having coated thereon a silver halide emulsion layer containing at least one of said 4-thiouracil compounds as an antifoggant and to certain of said 4-thiouracil compounds as new compounds.

During development of a silver halide emulsion, small amounts of silver halide are reduced to metallic silver regardless of whether or not they have been exposed. This eduction of silver ion produces a background fog which is more specifically referred to as chemical fog.

Chemical fog, apparent in most silver halide systems, has been reduced by prior art methods of processing exposed silver halide material in the presence of compounds which restrict development of unexposed silver halide. Such compounds can be incorporated in the silver halide emulsion or in the processing solutions for developing such silver halide emulsions. Compounds which have been found to have a chemical fog-inhibiting effect on emulsions which have been subjected to high temperature and high humidity conditions are referred to as emulsion stabilizers. On the other hand, compounds which have been found to have chemical fog inhibiting effects on emulsions which have not been exposed to adverse storage conditions are referred to as antifoggants. Although a large number of emulsion stabilizers and antifoggants have been used in the prior art, many of these compounds cause undesirable losses in emulsion speed and contrast and others lack adequate compatibility with emulsion gelatin. The 4-thiouracil compounds of the present invention very effectively prevent fog, particularly after storage of the silver halide emulsions, without adversely effecting the speed or gamma.

It is an object of the invention to provide adducts of tertiary enamines and alkoxycarbonyl isothiocyanates. It is a further object of the invention to provide a process for preparing 4-thiouracil compounds by reacting said adducts with ammonia or a primary amine. Further objects of the invention are to provide new 4-thiouracil compounds, to provide silver halide photographic emulsions containing a 4-thiouracil compound to reduce fog and to provide the light-sensitive photographic elements referred to hereinbefore.

The manner in which the foregoing objects and other objects of the invention are accomplished in accordance with our invention will be apparent from the following detailed description of the invention.

The tertiary enamine utilized to form the novel adducts of the invention has the formula:

1.
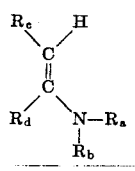

wherein $R_a$ and $R_b$ each represents an alkyl group such as methyl, ethyl, propyl, isopropyl, butyl, isobutyl, pentyl, hexyl, octyl, decyl, etc., for example, especially a lower alkyl group having 1 to 6 carbon atoms and a benzene nucleus, and wherein

collectively represents a saturated 5 or 6 membered heterocyclic nucleus such as 1-pyrrolidinyl, piperidino, morpholino, 1-pyrazolidinyl and 3-oxazolidinyl, for example, $R_c$ represents hydrogen, lower alkyl, lower alkoxy, carb(lower alkoxy) and a benzene nucleus, $R_d$ represents hydrogen and lower alkyl, and wherein $R_c$ and $R_d$ collectively represent a polymethylene chain having at least two carbon atoms, such as ethylene ($-CH_2CH_2-$), trimethylene ($-CH_2CH_2CH_2-$), tetramethylene ($-CH_2CH_2CH_2CH_2-$), pentamethylene ($-CH_2CH_2CH_2CH_2CH_2-$) and hexamethylene ($-CH_2CH_2CH_2CH_2CH_2CH_2-$), for example, and thus together with the carbon atoms to which they are attached represent a cyclobutenylene nucleus, a cyclopentenylene nucleus, a cyclohexenylene nucleus, a cycloheptenylene nucleus and a cyclooctenylene nucleus, for example.

The term "lower alkyl" when used herein and in the claims, unless specifically indicated otherwise, refers to an alkyl group having 1 to 6 carbon atoms such as methyl, ethyl, propyl, isopropyl, butyl, isobutyl, pentyl and hexyl, for example.

The term "lower alkoxy" when used herein and in the claims, unless specifically indicated otherwise, refers to an alkoxy group having 1 to 6 carbon atoms such as methoxy, ethoxy, propoxy, isopropoxy, butoxy, isobutoxy, pentyloxy and hexyloxy, for example.

The term "a benzene nucleus" when used herein and in the claims, unless specifically indicated otherwise, refers to phenyl and substituted phenyl nuclei such as alkylphenyl, alkoxyphenyl, halophenyl and hydroxyphenyl nuclei, for example. Illustrative alkylphenyl nuclei include, for example, (o-,m-,p-)-methylphenyl, (o-,m-,p-)ethylphenyl, (o-,m-,p-)propylphenyl, (o-,m-,p-)isopropylphenyl and (o-,m-,p-)butyphenyl. (o-,m-,p-)-methoxyphenly, (o-,m-,p-)ethoxyphenyl, (o-,m-,p-)propoxyphenyl, (o-,m-,p-)isopropoxyphenyl and (o-,m-,p-)butoxyphenyl, for example, are illustrative alkoxyphenyl nuclei. (o-,m-,p-)chlorophenyl (o-,m-,p-)fluorophenyl and (o-,m-,p-)bromophenyl, for example, are illustrative halophenyl nuclei. (o-,m-,p-)hydroxyphenyl are illustrative of hydroxyphenyl nuclei.

Methoxycarbonyl, ethoxycarbonyl, propoxycarbonyl, isopropoxycarbonyl, butoxycarbonyl, pentyloxycarbonyl and hexyloxycarbonyl, for example, are illustrative of carb(lower alkoxy) groups.

The alkoxycarbonyl isothiocyanate used to form the novel adducts of the invention has the formula:

2.
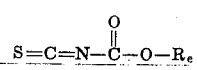

wherein wherein e represents an alkyl group such as methyl, ethyl, propyl, isopropyl, butyl, isobutyl, pentyl, hexyl, octyl, decyl, etc., for example, especially a lower alkyl group.

The novel adducts of the invention are prepared by reacting a tertiary enamine having the formula 1 with an isothiocyanate having the formula 2 without substantial heating to form novel adducts having the formula:

3.
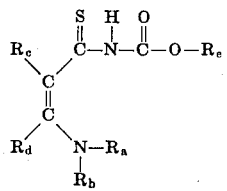

wherein $R_a, R_b, R_c, R_d$ and $R_e$ have the meaning previously assigned to them.

An adduct having the formula 3 is reacted with ammonia or a primary amine to form a 4thiouracil having the formula:

4.

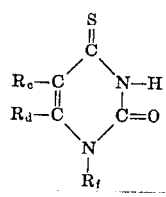

wherein $R_c$ and $R_d$ have the meaning previously assigned to them and $R_f$ represents hydrogen or the organic portion of a primary organic amine.

The primary amines which are reacted with the adducts having the formula 3 to obtain the 4-thiouracil compounds of the invention have the formula $R_fNH_2$ wherein $R_f$ has the meaning previously assigned to it.

Illustrative of the amines having the formula $R_fNH_2$ are, for example, ammonia, alkylamines such as, for example, methylamine, ethylamine, propylamine, isopropylamine, butylamine, isobutylamine, pentylamine, hexylamine, heptylamine, octylamine, decylamine, dodecylamine, etc.; hydroxylamine such as, for example, 2-hydroxyethylamine, 3-hydroxypropylamine 3-hydroxybutylamine, 4-hydroxybutylamine, 5-hydroxypentylamine, 6-hydroxyhexylamine, etc.; alkoxyalkylamines, such as, for example, 2-methoxyethylamine, 2-ethoxyethylamine, 2-propoxyethylamine, 2-butoxyethylamine, 3-methoxypropylamine, 3-ethoxypropylamine, 3-propoxypropylamine, 4-methoxybutylamine, 4-ethoxybutylamine, etc., aralkylamines such as benzylamine and phenethylamine, for example, a carboxyalkylamine, such as, for example, carboxymethylamine, 2-carboxyethylamine, 3carboxypropylamine, 4-carboxybutylamine, 5-carboxypentylamine, 6-carboxyhexylamine, etc.; an $H_2N-(CH_2)_n-$COO-alkyl amine, wherein n represents a whole number from 1 to 4, such as, for example, $H_2NCH_2COOCH_3$, $H_2NCH_2COOC_2H_5$, $H_2NCH_2COOC_3H_7$, $H_2NCH_2COOC_4H_9, H_2NCH_2CH_2COOCH_3$, $H_2NCH_2CH_2COOC_2H_5$, $H_2NCH_2CH_2COOC_3H_7$, $H_2NCH_2CH_2COOC_4H_9$, $H_2NCH_2CH_2CH_2COOCH_3$ $H_2NCH_2CH_2COOC_4H_9$, $H_2N(CH_2)_4COOCH_3$, $H_2N(CH_2)_4COOC_2H_5$, $H_2N(CH_2)_4COOC_3H_7$, $H_2N(CH_2)_4COOC_4H_9$, etc.; a dialkylaminoalkylamine such as, for example, 2-dimethylaminoethylamine, 2-diethylaminoethylamine, 2-dipropylaminoethylamine, 2-diisopropylaminoethylamine, 2-dibutylaminoethylamine, 3-dimethylaminopropylamine, 3-diethylaminopropylamine, 3-dipropylaminopropylamine, 3-diisopropylaminopropylamine, 4-dibutylaminopropylamine, 4-dimethylaminobutylamine, 4-diethylaminobutylamine, 4-dipropylaminbutylamine, 4-diisopropylaminobutylamine, 4-dibutylaminobutylamine; an arylamine, such as, for example, aniline (o-, m-, p-)toluidine, (o-, m-, p-)ethylaniline (o-, m-, p-)anisidine, (o-, m-, p-)-phenetidine, (o-, m-, p-)chloroaniline, (o-, m-, p-)bromoaniline, (o-, m-, p-)hydroxyaniline, 2,5-dimethoxyaniline, 2,5Diethyoxyaniline, 1,2,3,-xylidine, 1,2,4-xylidine, 1,3,2-xylidine, 1,3,4,-xylidine, 1,4,2-xylidine, 1,3,5-xylidine, 4-aminodiphenyl, etc., and heterocyclic amines such as 4-(2-aminoethyl)morpholine

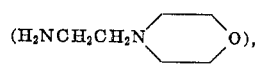

4-(aminopropyl)morpholine, 4-(aminobutyl)-morpholine, 1-(21-(2-aminoethyl)-2-methyl-pyrrolidine and 1-(2-aminoethyl)piperidine, for example.

As previously noted, the adducts having the formula 3 are prepared by reacting a tertiary enamine having the formula 1 with an alkoxycarbonyl isothiocyanate having the formula 2.

The reaction is carried out without the necessity of heating and preferably with agitation and at ambient temperature. The reaction can be carried out in solution in any solvent in which the adducts are insoluble, such as ether (i.e., diethyl ether), petroleum ether, and mixtures thereof, for example. The preparation of the adducts is illustrated hereinafter. Other solvents that can be used include, for example, diisopropyl ether, dimethyoxyethane, ligroin, benzene, and chlorinated solvents such as dichloroethane, chloroform, tetrachloroethane and carbon tetrachloride. The use of ether, petroleum ether, and mixtures thereof has been found to very satisfactory. Temperatures in the Examples and elsewhere herein are in degrees centigrade unless otherwise indicated.

EXAMPLE 1

1-(N-Carbethoxythiocarbamoyl)-2-morpholino-cyclopentene

To a water-cooled, stirred solution of 15.3 g. (0.10 mole) of 1-morpholinocyclopentene in 60 ml. of dry ether was added, dropwise, 13.1 g. (0.10 mole) of ethoxycarbonyl isothiocyanate diluted with 15 ml. of dry ether. Soon after addition was begun, a red-orange precipitate began to form. After completion of the addition of the isothiocyanate, the mixture was allowed to stir in the cold for 3 hours. The product, 1-(N-carbethoxythiocarbamoyl)-2-morpholino-cyclopentene, was isolated by filtration, washed thoroughly with dry ether, and air-dried. Yield, 26.2 g.; m.p. 123°–124°. A small sample was recrystallized from methanol as dark red prisms, m.p. 124°–125°.

EXAMPLE 2

2-(N-Carbethoxythiocarbamoyl)-1-pyrrolidino-1-butene

To a water-cooled, stirred solution of 12.5 g. (0.10 mole) of 1-pyrrolidino-1-butene in 50 ml. of 1:1 ether-petroleum ether was added, dropwise, 13.1 g. (0.10 mole) of ethoxycarbonyl isothiocyanate in 10 ml. ether-petroleum ether. After addition, stirring was continued for 2.5 hours. The orange precipitate, 2-(N-carbethoxythiocarbamoyl)-1-pyrrolidino-1-butene, was isolated by filtration, washed thoroughly with 1:1 ether-petroleum ether, and air-dried. Yield, 19.0 g.; m.p. 72°–74. A small sample was recrystallized from ether-petroleum ether, then from ether, giving tiny yellow-orange prisms, m.p. 75°–77°. If after the reaction time given above formation of product is incomplete, a second crop can be obtained from the combined washings and mother liquors by placing them in the cold for several days.

The 4-thiouracil compounds are prepared by reacting an adduct having the formula 3 with ammonia or a primary amine. The reaction can be carried out in solution or suspension. Preferably the reaction is carried out with agitation, such as stirring. The reaction is normally carried out in the presence of an inert solvent. Suitable solvents include water, alcohols such as ethanol, n-propyl alcohol and isopropyl alcohol, and dimethylformamide, for example. The reaction takes place without the necessity of heating and is preferably carried out at ambient temperature. The reaction mixture is preferably cooled just prior to filtering to insure maximum recovery of the precipitated product. This cooling is common practice but is not a part of the reaction per se. The ratio of the reactants can vary widely. As in the case of the formation of the adducts, the reaction proceeds to good yields with conventional techniques. The ratio of the reactants is generally equimolar but ratios of 10 to 1 and more for either component are operable. The adduct component, prepared as described hereinbefore, is suitable for use without purification. The preparation of the 4-thiouracil compounds is illustrated by the following Examples.

EXAMPLE 3

6,7-Dihydro-1-carbethoxymethyl-2(1H)-oxo-5H-cyclopenta-pyrimidine-4(3H)-thione

Glycine ethyl ester was prepared by passing ammonia gas through a chloroform suspension of the hydrochloride, filtering off the salt, concentrating the filtrate and distilling the oil. The product was stored in a freezer.

Twenty grams (0.070 mole) of 1-(N-carbethoxythiocarbamoyl)-2-(N-morpholine(cyclopentene prepared as in example 1 was slurried in 70 ml. of ethanol (magnetic stirring) and 10 ml. of the glycine ethyl ester was added in one portion. After several minutes, a complete solution was formed, followed shortly by the precipitation of yellow plates. The mixture was stirred for 30 minutes more, chilled and filtered. The product was washed with chilled ethanol, a little dry ether, and air-dried. Yield, 16.3 g.; m.p. 179°–180°. Two recrystallizations from ethanol give pale yellow plates; m.p. 183°–184°.

EXAMPLE 4

5-Ethyl-4-thiouracil 8.0 Grams (0.031 mole) of 2-(N-carbethoxythiocarbamoyl)-1-pyrrolidino-1-butene, prepared as in Example 2, were dissolved in 100 ml. of concentrated aqueous ammonia. The solution was allowed to stand overnight, filtered free of a small tar residue, then concentrated under reduced pressure to remove the bulk of ammonia. Dropwise acidification with concentrated HCl in the cold to pH 3– (Hydrion Paper) gave 4.3 g. of pale yellow product; m.p. 230°–250° Dec. Two recrystallizations from methanol gave analytically pure material as tiny needles, m.p. > 250° Dec.

EXAMPLE 5

5-Carbethoxy-1-(2-hydroxyethyl)-6-methyl-4-thiouracil

Ethyl 2-(N-carbethoxythiocarbamoyl)-3-dimethylaminocrotonate was prepared from ethoxycarbonyl isothiocyanate and ethyl 3-dimethylaminocrotonate by procedures similar to those described in Examples 1 and 2 using ether as the solvent. To a solution of 5 g. (0.017 mole) of this adduct in 40 ml. of dimethylformamide was added 3.5 ml. of 2aminoethanol. The mixture as allowed to stand at room temperature for 16 hours. The solvent was removed under reduced pressure and the residue taken up in 60 ml. of water. Acidification in the cold gave 3.6 g. of the desired product as an off-white solid, m.p. 145°–147°. Two recrystallizations from water (one filtration through decolorizing carbon) gave analytically pure material as pale yellow prisms, m.p. 147°–148°.

EXAMPLE 6

5,6,7,8-Tetrahydro-2(1H)-oxo-1-phenylquinazoline-4-(3H)-thione 1-(N-Carbethoxythiocarbamoyl)-2-morpholinocyclohexene 8.0 g. (0.027 mole), was suspended in 50 ml. of ethanol and treated, while stirring, with 6 ml. of aniline. Complete solution occurred followed by precipitation of the product.

The mixture was stirred for 30 minutes longer and then filtered. 6.2 grams of crude material which darkened above 270° and melted with decomposition at 280°–282° were obtained. Pure product was obtained by recrystallization from chloroform-ethanol (yellow plates), m.p. 287°–294° Dec.

EXAMPLE 7

1-(2-Morpholinoethyl)-5-phenyl-4-thiouracil 5 grams (0.016 mole) of α(N-carbethoxythiocarbamoyl)-β-diethylaminostyrene were suspended in 40 ml. of ethanol and treated with 3.5 ml. of N-(2-aminoethyl)morpholine, with stirring. The stirring effected complete solution of the starting adduct. After 15 minutes, the product precipitated. The mixture was allowed to stand overnight, then filtered. Yield 4.3 g., m.p. 167°–168°. Recrystallization from ethanol gave yellow needles of unchanged melting point.

The mechanism of 4-thiouracil formation is believed to be an amine exchange followed by cyclization. The driving force of the reaction is probably the cyclization which, under the reaction conditions, is irreversible. This is illustrated as follows:

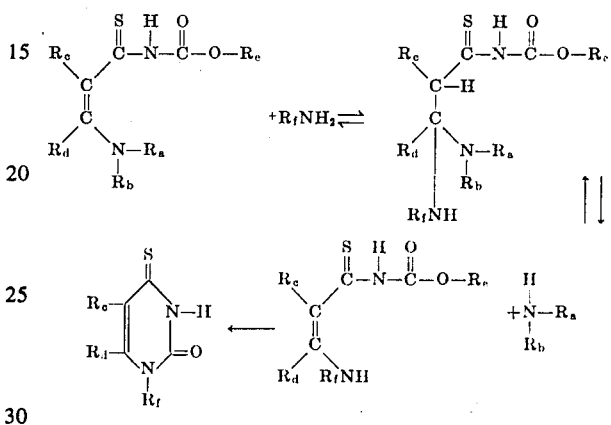

It has been found that where $R_d$ is phenyl and $R_a$ and $R_b$ together complete a morpholine radical, the adduct does not react with the primary amine to give a thiouracil under the reaction conditions mentioned above. It is believed that the bulk or orientation of the phenyl radical may have hindered the carbon atom to which the phenyl radical is attached to an extent that the amine was incapable of reaction with same. For this reason, it is preferable that $R_d$ is hydrogen or an alkyl group having no more than 3 carbon atoms. When $R_d$ is an alkyl group, it is preferably methyl.

The following table shows additional ethoxycarbonyl isothiocyanate-tertiary enamine adducts prepared similarly as in examples 1 and 2.

TABLE I.—ENAMINE-ETHOXYCARBONYL ISOTHIOCYANATE ADDUCTS

| Example No. | Enamine | Recryst. solvent | Yield [a], percent | M.P., °C. |
| --- | --- | --- | --- | --- |
| 8 | 1-(N-piperidino)-propene | Ether | 64 | 115–16 |
| 9 | β-Diethylamino-styrene | Ether ethanol | 89 | 113–14 |
| 10 | α-(N-morpholino)-styrene | Ethanol | 91 | [b] 162–63 |
| 11 | 1-(N-morpholino)-cyclohexene | Ether-ligroin | 84 | 86–87 |
| 12 | 1-(N-pyrrolidino)-cyclohexene | Ether | 87 | 78–80 |
| 13 | Ethyl β-dimethyl-aminocrotonate | Ethanol | 83 | [b] 148–50 |

[a] Yields based on crude material.
[b] Decomposition.

Tables II, III and IV show additional 4-thiouracil compounds prepared in accordance with the process of the invention. These compounds were prepared by the general procedure used in preparing the 4-thiouracil compounds of Examples 3–7.

TABLE II

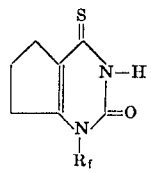

| Example No. | $R_f$ | Recryst. solvent | Yield, percent | M.P., (°C.) |
| --- | --- | --- | --- | --- |
| 14 | H | Ethanol | 100 | >265 |
| 15 | $CH_3$ | Chloroform | 87 | [1] 245–49 |
| 16 | $C_6H_5$ | Chloroformethanol | 95 | [1] >250 |
| 17 | $CH_2CH_2OH$ | Ethanol | 89 | [1] 236–38 |
| 18 | $CH_2COOH$ | Methanol-water | 100 | [1] >250 |

[1] Decomposition.

TABLE III

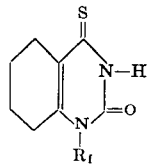

| Ex. No. | $R_f$ | Recryst. solvent | Yield, percent | M.P., (° C.) |
|---|---|---|---|---|
| 19 | H | Ethanol | 96 | [1] 282-86 |
| 20 | $CH_3$ | ----do---- | 84 | [1] 241-45 |
| 21 | $C_6H_5$ | Chloroformethanol | 89 | [1] 287-94 |
| 22 | $CH_2CH_2OH$ | Ethanol | 84 | [1] 234-35 |
| 23 | $CH_2CH_2N\!\!\diagup\!\!\diagdown\!\!O$ (morpholino) | ----do---- | 80 | 212-13 |
| 24 | $CH_2COOC_2H_5$ | ----do---- | 70 | 171-72 |

[1] Decomposition.

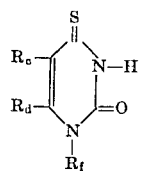

TABLE IV

| Example No. | $R_f$ | $R_c$ | $R_d$ | Recryst. solvent | Yield, percent | M.P., ° C. |
|---|---|---|---|---|---|---|
| 25 | $CH_3$ | $C_2H_5$ | H | Ethanol | 90 | 171-72 |
| 26 | $C_6H_5$ | $C_2H_5$ | H | ----do---- | 83 | 235-36 |
| 27 | $CH_2CH_2OH$ | $C_2H_5$ | H | ----do---- | 88 | 213-15 |
| 28 | $CH_2CH_2N(C_2H_5)_2$ | $C_2H_5$ | H | Ethanol water | 54 | 124-25 |
| 29 | $CH_3$ | $C_6H_5$ | H | Acetonitrile | 89 | 282-83 |
| 30 | $C_6H_5$ | $C_6H_5$ | H | Ethanol | 88 | 219-20 |
| 31 | $CH_2CH_2N\!\!\diagup\!\!\diagdown\!\!O$ (morpholino) | $C_6H_5$ | H | ----do---- | 83 | 167-68 |
| 32 | H | $CH_3$ | H | Water | 86 | [1] >300 |

[1] Decomposition.

The effectiveness of the 4-thiouracil compounds in reducing fog according to the invention is shown in Table V hereinafter. 4-Thiouracil compounds identified and in the amount shown in Table V were added to separate portions of a high-speed gelatino silver bromoidide emulsion which had been panchromatically sensitized with a cyanine dye. Each emulsion was coated on a cellulose acetate film support at a coverage of 459 mg. of silver and 1,040 mg. of gelatin per square foot. Each emulsion was exposed on an Eastman 1B sensitometer, processed for 5 minutes in Kodak DK-50 developer, fixed, washed and dried. Four series of emulsions were prepared and the results shown in the table are in relation to a control run for each of the four series as is apparent in the table.

The preparation of photographic silver halide emulsions such as are suitably stabilized with the 4-thiouracils of this invention typically involves three separate operations:
 1. emulsification and digestion of silver halide
 2. the freeing of the emulsion of excess water-soluble salts, suitable by washing with water and
 3. the second digestion or "after ripening" to obtain increased emulsion speed or sensitivity.

(Mees, "The Theory of the Photographic Process," 1954.) The new antifoggants can be added to the emulsion before he final digestion or after-ripening or it can be added immediately prior to the coating.

TABLE V

| Compound of Example Number | Concentration g./mole of silver | Fresh test | | | Two week incubation test | | |
|---|---|---|---|---|---|---|---|
| | | Relative speed | γ | Fog | Relative speed | γ | Fog |
| Control | | 100 | 1.34 | .14 | 46 | 0.96 | .70 |
| 27 | .009 | 107 | 1.38 | .13 | 49 | 0.78 | .39 |
| 26 | .009 | 82 | 1.27 | .11 | 65 | 1.15 | .25 |
| 25 | .03 | 100 | 1.37 | .12 | 85 | 1.28 | .29 |
| 28 | .03 | 105 | 1.32 | .13 | 58 | 0.92 | .55 |
| 4 | .03 | 89 | 1.28 | .11 | 69 | 1.03 | .25 |
| Control | | 100 | 1.38 | .14 | 67 | 1.07 | .49 |
| 6 | .009 | 83 | 1.35 | .15 | 76 | 1.12 | .21 |
| 14 | .009 | 82 | 1.33 | .15 | 74 | 1.22 | .19 |
| 15 | .03 | 97 | 1.33 | .12 | 82 | 1.18 | .20 |
| 16 | .009 | 85 | 1.28 | .14 | 71 | 1.13 | .21 |
| 17 | .03 | 107 | 1.33 | .14 | 87 | 1.12 | .22 |
| 19 | .03 | 91 | 1.32 | .13 | 74 | 1.20 | .22 |
| 20 | .03 | 87 | 1.28 | .13 | 78 | 1.10 | .17 |
| 21 | .03 | 100 | 1.28 | .12 | 80 | 1.10 | .20 |
| 22 | .009 | 83 | 1.35 | .15 | 76 | 1.12 | .21 |
| Control | | 100 | 1.55 | .17 | 91 | 1.16 | .76 |
| 3 | 0.03 | 99 | 1.48 | .16 | 94 | 1.32 | .35 |
| 5 | 0.09 | 100 | 1.53 | .17 | 98 | 1.40 | .29 |
| 7 | 0.03 | 100 | 1.57 | .16 | 97 | 1.30 | .37 |
| 18 | 0.09 | 100 | 1.40 | .10 | 94 | 1.25 | .24 |
| 24 | 0.03 | 98 | 1.52 | .16 | 95 | 1.20 | .24 |
| 32 | 0.03 | 99 | 1.53 | .14 | 95 | 1.25 | .33 |
| Control | | 100 | 1.38 | .14 | 94 | 1.07 | .49 |
| 23 | 0.03 | 100 | 1.33 | .16 | 97 | 1.12 | .36 |

The silver halide emulsion or photographic element containing the antifoggants of this invention can contain conventional addenda such as gelatin plasticizers, coating aids, and hardeners such as aldehyde hardeners, e.g., formaldehyde, mucocloric acid, glutaraldehyde bis(sodium bisulfite), maleic dialdehyde, aziridines, dioxane derivatives and oxypolysaccharides. Spectral sensitizers which can be used are the cyanines, merocyanines, complex (trinuclear) cyanines, complex (trinuclear) merocyanines, styryls, and hemicyanines, for example. Sensitizing dyes useful in sensitizing such emulsions are described, for example, in U.S. Pat. Nos. 2,526,632 of Brooker and White issued Oct. 24, 1950, and 2,503,776 of Sprague issued Apr. 11, 1950. Developing agents can also be incorporated into the silver halide emulsion if desired or can be contained in a contiguous layer. Various silver salts can be used as the sensitive salt such as silver bromide, silver iodide, silver chloride, or mixed silver halides such as silver chlorobromide or silver bromoidide. The silver halides used can be those which form latent images predominantly on the surface of the silver halide grains or those which form latent images inside the silver halide crystals such as described in U.S. Pat. No. 2,592,250 of Davey and Knott issued Apr. 8, 1952.

The silver halide emulsion layer of a photographic element containing the antifoggants of the invention can contain any of the hydrophilic, water-permeable binding materials suitable for this purpose. Suitable materials include gelatin, colloidal albumin, polyvinyl compounds, cellulose derivatives, acrylamide polymers, etc. Mixtures of these binding agents can also be used. The binding agents for the emulsion layer of the photographic element can also contain dispersed polymerized vinyl compounds. Such compounds are disclosed, for example, in U.S. Pat. Nos. 3,142,568 of Nottorf issued July 28, 1964; 3,193,386 of White issued July 6, 1965; 3,062,674 of Houck, Smith and Yudelson issued Nov. 6, 1962; and 3,220,844 of Houck, Smith and Yudelson issued Nov. 30, 1965; and include the water-insoluble polymers of alkyl acrylates and methacrylates, acrylic acid, sulfoalkyl acrylates or methacrylates and the like.

The silver halide emulsion of a photographic element containing the antifoggants of the invention can be coated on a wide variety of supports. Typical supports are cellulose nitrate film, cellulose ester film, polyvinyl acetal film, polystyrene film, poly(ethylene terephthalate) film and related films or resinous materials as well as glass, paper, metal and the like. Supports such as paper which are coated with α-olefin polymers, particularly polymers of α-olefins containing two or more carbon atoms, as exemplified by polyethylene, polypropylene, ethylene-butene copolymers and the like can also be employed.

The speed of the photographic emulsions containing the antifoggants of the invention can be further enhanced by including in the emulsions a variety of hydrophilic colloids such as carboxymethyl protein of the type described in U.S. Pat. No. 3,001,890 of Gates, Jr., Miller and Koller issued Dec. 5, 1961, and polysaccharides of the type described in Canadian Pat. No. 635,206 of Koller and Russell issued Jan. 23, 1962.

Photographic emulsions containing the antifoggants of the invention can also contain speed-increasing compounds such as quaternary ammonium compounds, polyethylene glycol or thioethers. Frequently, useful effects can be obtained by adding the aforementioned speed-increasing compounds to the photographic developer solutions instead of, or in addition to, the photographic emulsions.

Photographic elements containing the antifoggants of the instant invention can be used in various kinds of photographic systems. In addition to being useful in X-ray and other nonoptically sensitized systems, they can also be used in orthochromatic, panchromatic and infrared sensitive systems. The sensitizing addenda can be added to photographic systems before or after any sensitizing dyes which are used.

Silver halide emulsions containing the antifoggants of the invention can be used in color photography, for example, emulsions containing color-forming couplers or emulsions to be developed by solutions containing couplers or other color-generating materials, emulsions of the mixed-packet type such as described in U.S. Pat. No. 2,698.794 of Godowsky issued Jan. 4, 1955; in silver dye-bleach systems; and emulsions of the mixed-grain type such as described in U.S. Pat. No. 2,592,243 of Carroll and Hanson issued Apr. 8, 1952.

Silver halide emulsions containing the antifoggants of the invention can be sensitized using any of the well-known techniques in emulsion making, for example, by digesting with naturally active gelatin or various sulfur, selenium, tellurium compounds and/or gold compounds. The emulsions can also be sensitized with salts of nobel metals of Group VIII of the Periodic Table which have an automatic weight greater than 100.

Silver halide emulsions containing the antifoggants of the invention can be used in diffusion transfer processes which utilize the undeveloped silver halide in nonimage areas of the negative to form a positive by dissolving the undeveloped silver halide and precipitating it on a silver layer in close proximity to the original silver halide emulsion layer. Such processes are described in U.S. Pat. Nos. 2,352,014 of Rott issued June 20, 1944; 2,543,181 of Land issued Feb. 27, 1951; and 3.020,155 of Yackel, Yutzy, Foster and Rasch issued Feb. 6, 1962. The emulsions can also be used in diffusion transfer color processes which utilize a diffusion transfer of an imagewise distribution of developer, coupler, or dye, from a light-sensitive layer to a second layer, while the two layers are in close proximity to one another. Silver halide emulsions containing the antifoggants of the invention can be processed in stabilization processes such as the ones described in U.S. Pat. No. 2,614,927 of Broughton and Woodward issued Oct. 21, 1952, and as described in the article "Stabilization Processing of Films and Papers" by H. D. Russell, E. C. Yackel and J. S. Bruce in *P.S.A. Journal, Photographic Science and Technique*, Volume 16B, Oct. 1950.

The antifogging agents of this invention can be incorporated to advantage during manufacture in silver halide emulsions representing the variations described above. Moreover, fog control in binderless silver halide films prepared by vapor deposition of silver halide on a suitable support can be achieved by coating the antifogging agents of the invention over the vapor deposited layer of silver halide.

Combinations of all the above-mentioned addenda can be used if desired.

The amount of antifoggant can vary quite widely and, in general, will be less than 1 g. per mole of silver. A greater amount can be effectively used where the antifoggant is incorporated in a layer other than the silver halide emulsion layer, and a lesser amount, generally less than 0.5 g. per mole of silver, and preferably less than 0.1 g. per mole of silver, can be used in the silver halide emulsion layer. The minimum amount is not critical since no adverse effect is incurred by using small amounts. However, it is preferred to use at least 0.001 g. per mole of silver to obtain a suitable level of fog reduction.

The 4-thiouracils useful in preventing fog can be made as described herein by reacting a tertiary enamine-alkoxycarbonyl isocyanate adduct with ammonia or a primary amine. Certain of the thiouracils, however, are known and may be prepared from their uracil analogs by thiation using phosphorous pentasulfide in pyridine. The overall yield of such reaction is uncertain, however, and it is therefore preferred to utilize 4-thiouracils prepared as herein disclosed since 4-thiouracils including those condensed with an alicyclic ring are thus readily obtainable in good yield. The tertiary enamines and alkoxycarbonyl isocyanates used in preparing the intermediate adducts according to the invention are known. The preparation of enamines is reviewed by Stork et al. *J. Am. Chem. Soc.*, Vol. 85, p. 207–222 (1963). Ethoxycarbonyl isothiocyanate and its preparation is described by Dixon and Taylor, *J. Chem. Soc.*, Vol. 93, p. 684 (1908). Other alkoxycarbonyl isothiocyanates can be prepared by appropriate variation of the procedure used by Dixon and Taylor to prepare ethoxycarbonyl isothiocyanate.

Certain 4-thiouracil antifoggants can also be prepared by reacting phenoxycarbonyl isothiocyanates with certain primary and secondary enamines as reported by Goerdeler et al. *Chem. Ber* 526 (1963), 97 3106 (1964) and 98 1531 (1965) as follows:

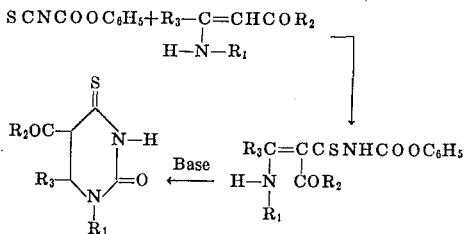

It will be noted that $R_1$ in the 4-thiouracil is thus derived from the enamine whereas the analogous radical on the 4-thiouracils produced by the present method is derived from primary or secondary amine thus giving much wider scope to this substituent on 4-thiouracils according to the present method.

The invention has been described in detail with particular reference to preferred embodiments thereof, but it will be understood that variations and modifications can be effected within the spirit and scope of the invention as described hereinbefore and as defined in the appended claims.

What is claimed is:

1. A light-sensitive silver halide emulsion containing as an antifoggant therein in effective antifoggant amount a 4-thiouracil compound having the formula:

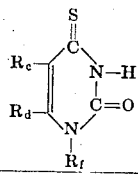

wherein $R_c$ represents hydrogen, lower alkyl, lower alkoxy, carb(lower alkoxy) or a benzene nucleus, $R_d$ represents hydrogen and lower alkoxy and wherein $R_c$ and $R_d$ collectively represent a polymethylene chain having at least two carbon atoms and $R_f$ represents hydrogen or the organic portion of a primary organic amine.

2. A light-sensitive silver halide emulsion in accordance with claim 1 wherein $R_f$ is hydrogen.

3. A light-sensitive silver halide emulsion in accordance with claim 1 wherein $R_f$ is an alkyl group.

4. A light-sensitive silver halide emulsion in accordance with claim 1 wherein $R_f$ is a hydroxyalkyl group.

5. A light-sensitive silver halide emulsion in accordance with claim 1 wherein $R_f$ is a dialkylaminoalkyl group.

6. A light-sensitive silver halide emulsion in accordance with claim 1 wherein $R_f$ is phenyl or substituted phenyl.

7. A light-sensitive silver halide emulsion in accordance with claim 1 wherein $R_f$ is phenyl.

8. A light-sensitive silver halide emulsion in accordance with claim 1 wherein

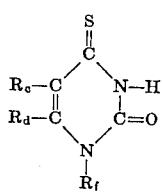

9. A light-sensitive silver halide emulsion in accordance with claim 1 wherein $R_c$ and $R_d$ collectively represent trimethylene.

10. A light-sensitive silver halide emulsion in accordance with claim 1 wherein $R_c$ and $R_d$ collectively represent tetramethylene.

11. A light-sensitive silver halide emulsion in accordance with claim 1 containing as an antifoggant 6,7-dihydro-1-carbethoxymethyl-2(1H)-oxo-5H-cyclopentapyrimidine-4-(3H)-thione.

12. A light-sensitive silver halide emulsion in accordance with claim 1 containing as an antifoggant 5,6,7,8-tetrahydro-2(1H)-oxo-1-phenylquinazoline-4-(3H)-thione.

13. A light-sensitive silver halide emulsion in accordance with claim 1 containing as an antifoggant 5-ethyl-1-phenyl-4-thiouracil.

14. A light-sensitive silver halide emulsion in accordance with claim 1 containing as an antifoggant 5-ethyl-4-thiouracil.

15. A light-sensitive silver halide emulsion in accordance with claim 1 containing as an antifoggant 5-carbethoxy-1-(2-hydroxyethyl)-6-methyl-4-thiouracil.

16. A photographic element comprising a support having thereon a layer containing a light-sensitive emulsion of claim 1.

17. A photographic element comprising a support having thereon a layer containing a light-sensitive emulsion of claim 9.

18. A photographic element comprising a support having thereon a layer containing a light-sensitive emulsion of claim 10.

* * * * *

PO-1050
(5/69)

UNITED STATES PATENT OFFICE
CERTIFICATE OF CORRECTION

Patent No. 3,622,340          Dated November 23, 1971

Inventor(s) Robert W. Lamon

It is certified that error appears in the above-identified patent and that said Letters Patent are hereby corrected as shown below:

Column 1, line 10, "21-thiouracid" should be --4-thiouracil--; lines 24 and 25, "eduction" should be --reduction--.

Column 2, line 58, "e" should be --$R_e$--.

Column 3, line 71 "(21-(2-aminoethyl)" should be --(2-aminoethyl)--.

Column 5, line 6, "(N-morpholine(cyclopentene" should be --(N-morpholino)cyclopentene; line 37, "2aminoethanol" should be --2-aminoethanol--.

Column 6, line 34, "morpholine" should be --morpholino--; line 74 "250" should be --280--.

Column 8, line 48, "mucocloric" should be --mucochloric--.

Column 9, line 24, "3,001,890" should be --3,011,890--; line 58, "automatic" should be --atomic--.

Column 11, line 30, after "wherein" insert --$R_f$ is 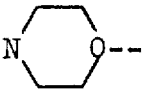-- and cancel the formula extending from lines 31 to 38.

Signed and sealed this 5th day of December 1972.

SEAL)
ttest:

DWARD M. FLETCHER, JR.
ttesting Officer

ROBERT GOTTSCHALK
Commissioner of Patents